(12) United States Patent
Lin et al.

(10) Patent No.: US 7,785,451 B2
(45) Date of Patent: Aug. 31, 2010

(54) PORTABLE OXYGEN MAINTENANCE AND REGULATION CONCENTRATOR APPARATUS

(75) Inventors: Shioujenq Andrew Lin, Tao-Yuan (TW); Yingjeng James Li, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 829 days.

(21) Appl. No.: 11/715,405

(22) Filed: Mar. 8, 2007

(65) Prior Publication Data

US 2008/0217176 A1    Sep. 11, 2008

(51) Int. Cl.
*C25B 9/10* (2006.01)
(52) U.S. Cl. .................. 204/271; 204/252; 204/258; 204/263; 204/265; 204/266

(58) Field of Classification Search ................. 204/252, 204/258, 263, 265, 266, 271, 272
See application file for complete search history.

(56) References Cited

U.S. PATENT DOCUMENTS 5,296,110 A * 3/1994 Tabatabaie-Raissi ........ 205/633

* cited by examiner

*Primary Examiner*—Bruce F Bell
(74) *Attorney, Agent, or Firm*—Bacon & Thomas, PLLC

(57) ABSTRACT

The fast and convenient usage of clean and pure oxygen supply devices will meet the requirements of medical application and special environment safety issues. The electrochemical oxygen concentration is a device by using an electrochemical reactor of one electrode of oxygen reduction and another electrode of oxygen generation. The operation of electrochemical reactor can achieve the easy control of air oxygen from one side to another side of this thin mask structure and the materials, design and engineering of this electrochemical oxygen concentration is workable for medical application.

2 Claims, 1 Drawing Sheet

PORTABLE OXYGEN MAINTENANCE AND REGULATION CONCENTRATOR APPARATUS

BACKGROUND OF THE INVENTION

1. Field of the Invention

The invention relates an oxygen maintenance and regulation concentrator, especially a portable oxygen maintenance and regulation concentrator apparatus operated under the normal temperature and pressure using the electrochemistry reaction.

2. Description of the Prior Art

The oxygen on the earth is one sort of the widespread application gas, especially for the personnel medical service demand, as inside the hospital or in the battlefield situation, even in the rare oxygen area around the high mountain for the personnel oxygen supplies, all are possible latent demands.

In the conventional oxygen supply system, the large-scale gas liquefaction way and the gas adsorption procedure are usually applied for providing the pure oxygen and for the large-scale industry demands.

Furthermore, in the industry technology field, there are many of several oxygen production methods, such as the thin film separation method, the water electrolysis method and so on. However, in the design for the oxygen production method, due to the security and convenience consideration, actually is unable to be developed as the portable oxygen apparatus. The conventional breathing apparatus is unable to be applied to the portable-type equipment, i.e. the portable-type equipment means for the easy carriageable equipment or the simple movement equipment. However, due to the huge occupation for the conventional technology, space so that the conventional technologies are completely not applied to the portable breathing apparatus.

Therefore, concerning the medical and the special environment demands, portable operated under the normal temperature and atmosphere oxygen mask have become as the important and the quite development potential equipments.

Regarding to the prior art, U.S. Pat. No. 6,638,400 "Electrochemical oxygen concentrator" invention patent, although using the electrochemistry reaction, the electrode plate are not the porous type metal plate, also the operating temperature reaches as high as 500° C., being unable to operate under the normal temperature.

Moreover, regarding to the prior art, U.S. Pat. No. 5,378,345 "Ceramic solid electrolyte-based electrochemical oxygen concentrator cell" invention patent, using the electrochemistry reaction, and the electrode plate are the multiple electrode plate, however not the porous type metal plate, the operating temperature reaches as high as 800° C., being unable to operate under the normal temperature.

Therefore, using the electrochemistry oxygen-reduction reaction, the oxygen from the air can be used, and the high-purity oxygen can be obtained to become as the new generation feasible idea and concept. Except decreasing the equipment manufacturing complexity, also the production cost for the equipment can be highly reduced.

SUMMARY OF THE INVENTION

This invention is related to the assembly apparatus combined by the electrode and the ionic conductor, basically by using the electrochemistry reaction system of the electric potential operation or the electric current operation, as the oxygen maintenance and regulation apparatus.

As reaction principles for the invention, firstly, using the oxygen from the air in the cathode electrode, carrying out the oxygen reduction reaction, and then the water molecule can be decomposed in the anode electrode for producing the oxygen. By the way of the ionic conductor and the external circuit transmission, the oxygen can be entered to the cathode electrode of this invention apparatus, also the oxygen can be produced in the anode electrode regulating and changing the oxygen of the air, becoming as the oxygen regulation concentrator apparatus.

By passing of the ionic conductor and the external circuit transmission, the oxygen can enter into the cathode electrode of the invention; also the oxygen can be produced in the anode electrode. The invention will become the controllable apparatus for oxygen production, and as the oxygen concentration controller for changing the oxygen concentration of the air, and for the oxygen of the air entering this invention.

The electrode of the invention having the different-size hole collection, and respirometric character, provides the oxygen to enter and release the pass way using the hydrophobic material as the hydrophobic interface. This half hydrophilic interface can provide the smooth way for gas entering and leaving, also can avoid the water molecule flood, simultaneously can provide the liquid phase transmission function between the ionic conductor and the electrode surface.

About the material selection for the electrode of the invention, in the porous cathode electrode, the electricity catalysis catalyst of the oxygen reduction reaction will comprise the noble metal such as platinum, or the metal oxidation $LaMnO3$, or the M (tmdbta) (Metal-Tetramethyldibenzotetraaza Annulene,) such as CoTMPP. It may cause the oxygen to be adsorbed on the surface, also as the electric conduction materials, can provide the electric potential regulation in order to carry out the chemical reduction reaction.

About the invention, the porous anode electrode materials will be selected including the Dimensional Stable Anode, DSA, for enhancing the reaction area and being more stable in the oxygen evaluation reaction, OER, also including the metal oxidization such as the ruthenium oxide supported by the titanium oxide.

The ion conduction matter for this invention could use the acid solution or the alkali solution, such as KOH, $H_2SO_4$ and so on. Under the consideration for the liquid tightness or the gas tightness of the electrode electrolyte combination, also may use the high polymer membrane of the hydrogen ion, or hydroxy ionic conduction using the composite materials pickled with the acid solution or the alkali solution, or the fiber net isolating the anode electrode or the cathode electrode, or the other inert-character materials.

This invention having the optimization design for the oxygen concentrator, is selected by the hydroxide radical ion conduction materials, also will make the electricity catalysis catalyst of the electrode having the better reaction speed.

The simple control circuit of the invention, the battery or the other power source all can be used for the oxygen concentrator apparatus of the invention, for conveniently regulating the oxygen supply.

The design for the oxygen concentrator apparatus of this invention will be the gas diffusible electrode, due to the gas diffusible electrode having the porous structures; therefore, the efficiency reduction caused by the mass transfer can be effective improvement.

The oxygen concentrator apparatus of this invention using the gas diffusible electrode as the air cathode electrode, the dimensional stable anode (DSA) as the anode producing gas, due to the transition metal having good stability in the anode procedure, therefore selecting the dimensional stable anode as the anode, combined together with the electrolyte.

This invention is a sort of portable type, can be used under the normal temperature and the atmosphere apparatus, therefore can be applied for the oxygen respirator, the skin covering, the pollution gas isolation and so on, as the oxygen regulation apparatus for the oxygen-need environment.

The best optimization design for this oxygen concentrator apparatus can be selected by the hydroxide radical ion or the hydrogen conduction materials, carrying out the better reaction speed for the electricity catalysis catalyst of the electrode.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
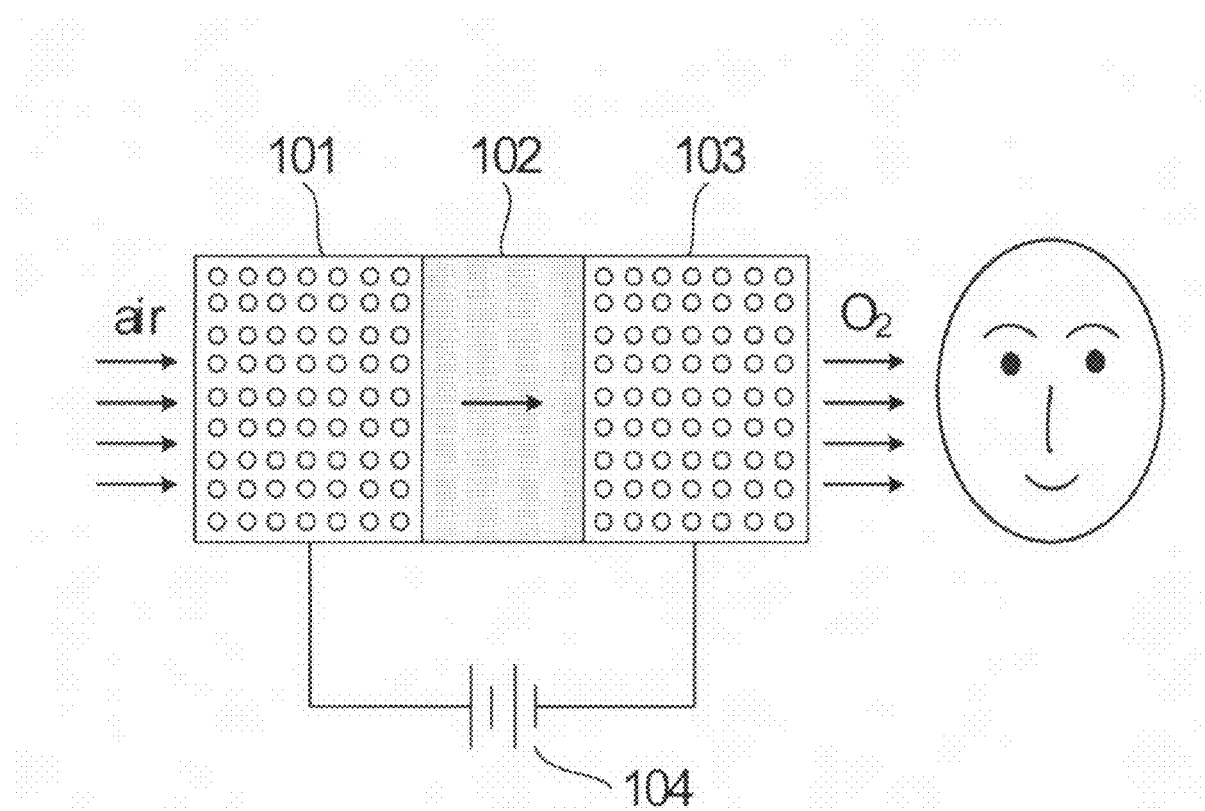
FIG. 1 is schematically illustrating the embodiment of the invention.

The following is a description of the present invention and the invention will firstly be described with reference to one exemplary structure. Some variations will then be described as well as advantages of the present invention. A preferred method of fabrication will then be discussed; also, an alternate, asymmetric embodiment will then be described along with the variations in the process flow to fabricate this embodiment.

This invention is the oxygen maintenance and regulation concentrator apparatus, mainly by using an electrochemistry reaction system, combined by the electrode and the ionic conductor, could be operated by the electric potential or the electric current, mainly purpose, also as the apparatus for maintaining oxygen concentration.

The principle of the invention is an oxygen reduction reaction using the oxygen from the air in the negative pole; also decomposing water molecule in the anode and then producing the oxygen.

This invention is one sort of portable oxygen maintenance and regulation concentrator apparatus, as FIG. 1 illustrating, using electrochemistry reaction system, including a porous cathode electrode as the first porous electrode, for the oxygen reduction reaction.

The chemical reaction equation for this porous cathode electrode will be the followings:

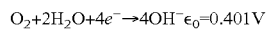

As feature 102 of FIG. 1 shows, as the electrolyte hydrogen ionic conductor, the system could use the alkali or the acid as the ionic conductor, as conducting two of electrodes. Due to the electrode reaction of the invention having the better operation performance in the alkalinity system, thus the organic polymer membrane or the inorganic materials of the hydroxy ionic conductor all can be the electrolyte materials for this system.

Such as feature 103 of FIG. 1 describes, using a porous anode electrode as the second porous electrode is provided for the oxygen production reaction. The chemical reaction equation for the porous positive electrode will be the following:

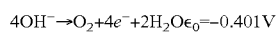

As feature 101, the electrode materials for the porous cathode electrode are selected from the oxygen reduction electrode materials that are the sort of compound having the oxygen adsorption function, normally are selected from the noble metal such as the platinum or the carbon supporting metal electricity catalysis catalyst, also could be the metal oxidation having the perovskite-type structure, such as LaMnO3 or its derivational compounds, or the M (tmdbta) (Metal-Tetramethyldibenzotetraaza Annulene,) such as FeTMPP, CoTMPP, or FeOEP and so on, as the compound having the oxygen adsorption function.

As feature 103 of FIG. 1, the porous anode electrode will be the oxygen reduction electrode structure as the gas respirometric structure, and having the hydrophobic electrode structure as the electrolyte interface of the hydrophilic electrode. Also, this hydrophobic electrode can be the gas entrance access having the hydrophilic-size hole against the water molecule fluid, as the gas porous electrode structure.

In addition, illustrated as feature 103, the porous anode electrode will be the electrode materials for producing the oxygen, also as the dimensional stable anode. In the oxygen production reaction process, for providing the response electric potential control, as well as due to the structural stability of the materials, the ruthenium oxide supported by the titanium oxide can be selected, or the other electric potential stable metal oxidation produced by the oxygen reaction, including the rutile-type oxidation, the spinel-type oxidation, the perovskite-type oxidation. The previous used titanium oxide can be shaped as mesh shape, or as for the gas dispersing supporting construction for the electrode producing gas. Also, by coating or the other thin film made attachment electrochemistry active materials, or the adherent materials all can be collected, however, the surface character between the different materials must be good electrical conductivity.

As feature 104 of FIG. 1 shows, the power source control circuit can be used for the oxygen concentrator, and the battery or the other power source can be provided for the power supply and can be processed for the electrochemistry reaction.

This invention, the previous mentioned cathode electrode and anode electrode can be put on the two sides, and feature 102, the electrolyte ionic conductor, can be put into central position between two sides for linking two electrodes, to form the whole reaction system. Feature 101, the porous cathode electrode can be the entrance electrode for the oxygen of the air entering. Another electrode, feature 103, the porous anode electrode can produce the oxygen. Feature 104 illustrates that power source control circuit can provide the electrical energy and process the electrochemistry reaction, controlling the oxygen amount, as the portable oxygen regulation and support apparatus.

The oxygen concentration by this invention regulation, at the time the concentration can be maintained either in the higher oxygen concentration or the lower oxygen concentration for the entrance oxygen, so that the ideally regulation effect of the oxygen concentrator can be achieved.

In the invention, the porous cathode electrode, the porous anode electrode, and the electrolyte material structure must be used by the appropriate manufacturing process and the seal structure, in order to guarantee the surface combination between the electrode materials and the electrolyte materials, as well as the related liquid tightness or the gas tightness structure can be for the gas entering and leaving, and then the isolation electrode electric-circuit for the ionic conductor can be provided for the ion channel function.

This invention is a sort of portable type apparatus can be used under the normal temperature and atmosphere, therefore can be applied for the oxygen respirator, the skin covering, the pollution gas isolation and so on, as the oxygen regulation apparatus for the oxygen-need environment.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A portable oxygen maintenance and regulation concentrator apparatus applied as a skin covering by using a porous cathode and anode electrode structure with an electrolyte, comprising:

a porous cathode electrode having a porous structure for adsorbing oxygen, wherein said porous cathode is made from a material selected from the group consisting of $LaMnO_3$, FeTMPP, CoTMPP and FeOEP;

a porous anode electrode having a hydrophilic-size hole against a water molecule fluid structure for producing oxygen, wherein said porous anode electrode is made from titanium oxide;

an electrolyte ionic conductor for conducting said porous cathode electrode and said porous anode electrode, wherein said electrolyte ionic conductor is made from a KOH electrolyte solution;

a power source control circuit with a battery for providing electrical power; and wherein said porous cathode electrode and said porous anode electrode are set on opposing sides of the apparatus, said electrolyte ionic conductor being set into a central position for linking said porous cathode electrode and said porous anode electrode, oxygen from ambient air enters said porous cathode electrode, and said power source control circuit with the battery providing the electrical power and controlling the produced oxygen amount.

2. A portable oxygen maintenance and regulation concentrator apparatus applied as a skin covering by using a porous cathode and anode electrode structure with an electrolyte, comprising:

a porous cathode electrode having a porous structure for adsorbing oxygen, wherein said porous cathode is made from a material selected from the group consisting of $LaMnO_3$, FeTMPP, CoTMPP and FeOEP;

a porous anode electrode having a hydrophilic-size hole against a water molecule fluid structure for producing oxygen, wherein said porous anode electrode is made from titanium oxide;

an electrolyte ionic conductor for conducting said porous cathode electrode and said porous anode electrode, wherein said electrolyte ionic conductor is made from a $H_2SO_4$ electrolyte solution;

a power source control circuit with a battery for providing electrical power; and wherein said porous cathode electrode and said porous anode electrode are set on opposing sides of the apparatus, said electrolyte ionic conductor being set into a central position for linking said porous cathode electrode and said porous anode electrode, oxygen from ambient air enters said porous cathode electrode, and said power source control circuit with the battery providing the electrical power and controlling the produced oxygen amount.

* * * * *